United States Patent
Collins et al.

(10) Patent No.: US 7,715,642 B1
(45) Date of Patent: May 11, 2010

(54) BITMAP IMAGE COMPRESSING

(75) Inventors: Roger S. Collins, Novato, CA (US);
Tony L. Robinson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 08/886,226

(22) Filed: Jul. 1, 1997

Related U.S. Application Data

(63) Continuation of application No. 08/468,290, filed on Jun. 6, 1995, now abandoned.

(51) Int. Cl.
*G06K 9/36* (2006.01)
*G09G 5/00* (2006.01)
*G06K 9/00* (2006.01)

(52) U.S. Cl. .............. 382/242; 382/243; 382/284; 345/629

(58) Field of Classification Search .......... 382/242, 382/243, 245, 232, 233, 162, 166, 173, 176, 382/100, 108, 199, 284, 294, 305; 345/582, 345/619, 629, 637, 638
See application file for complete search history.

(56) References Cited

U.S. PATENT DOCUMENTS

| | | | | |
|---|---|---|---|---|
| 4,729,127 A | * | 3/1988 | Chan et al. ............. | 382/240 |
| 4,847,604 A | * | 7/1989 | Doyle ..................... | 345/180 |
| 4,855,934 A | * | 8/1989 | Robinson ................ | 395/130 |
| 4,935,879 A | * | 6/1990 | Ueda ...................... | 395/130 |
| 4,951,038 A | * | 8/1990 | Yamamura .............. | 345/133 |
| 5,086,496 A | * | 2/1992 | Mulmuley ............... | 345/421 |
| 5,103,499 A | * | 4/1992 | Miner et al. ............. | 395/162 |
| 5,225,904 A | * | 7/1993 | Golin et al. ............. | 348/410 |
| 5,363,119 A | * | 11/1994 | Snyder et al. ........... | 345/185 |
| 5,379,049 A | * | 1/1995 | Leach ..................... | 345/199 |
| 5,382,100 A | * | 1/1995 | Sakuragi et al. ......... | 395/102 |
| 5,440,720 A | * | 8/1995 | Baisuck et al. .......... | 395/500 |
| 5,475,809 A | * | 12/1995 | Sato ....................... | 395/133 |
| 5,539,865 A | * | 7/1996 | Gentile ................... | 395/114 |
| 5,561,746 A | * | 10/1996 | Murata et al. ........... | 395/125 |
| 5,644,406 A | * | 7/1997 | Harrington et al. ...... | 382/239 |

FOREIGN PATENT DOCUMENTS

EP 475601 A3 * 3/1992

OTHER PUBLICATIONS

Foley et al., Computer Graphics: Principles and Practice, 1990, p. 980, Textbook.*

* cited by examiner

*Primary Examiner*—Yon Couso

(57) ABSTRACT

An image (e.g., a sprite) having at least three textures is compressed by generating a map which represents boundaries separating regions in the image, and generating pointers that associate each of the regions with one of the textures. The resulting data structure may be used in decompressing the image.

11 Claims, 11 Drawing Sheets

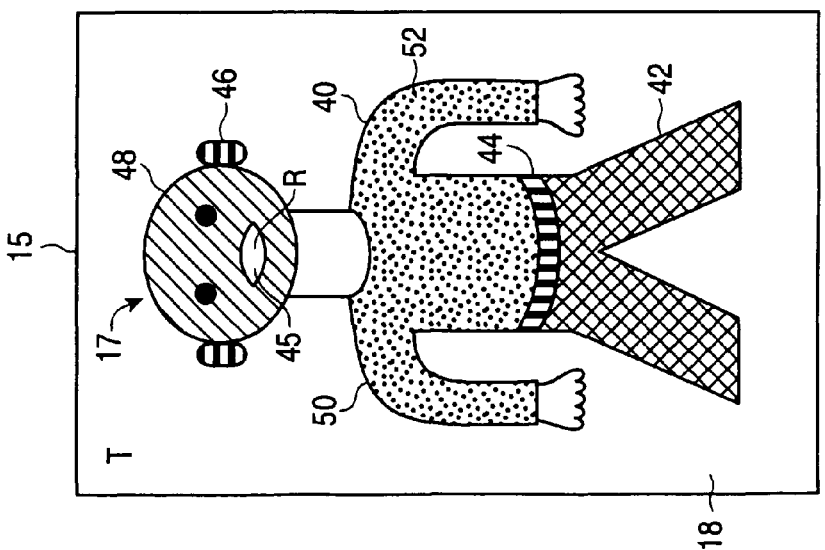

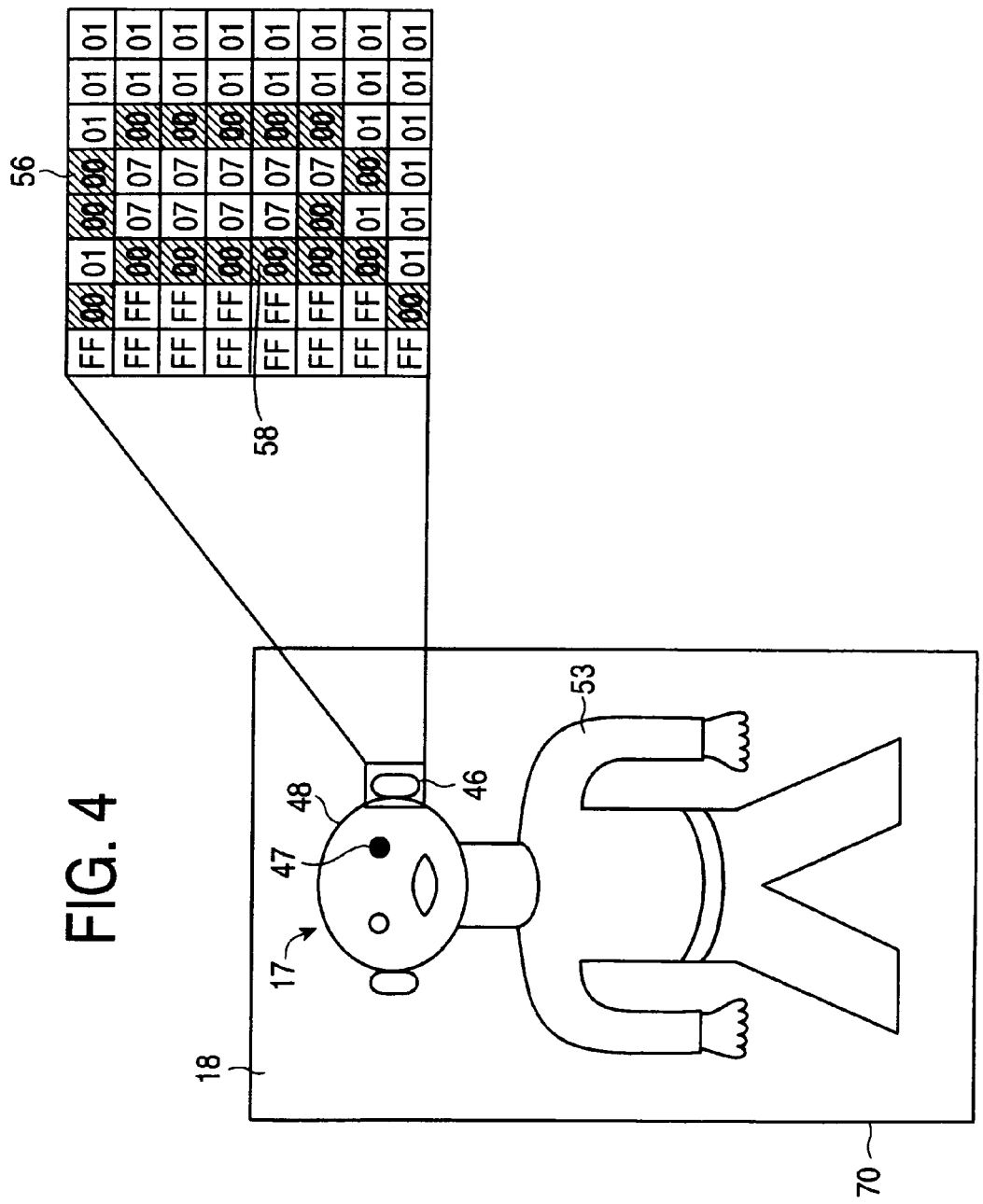

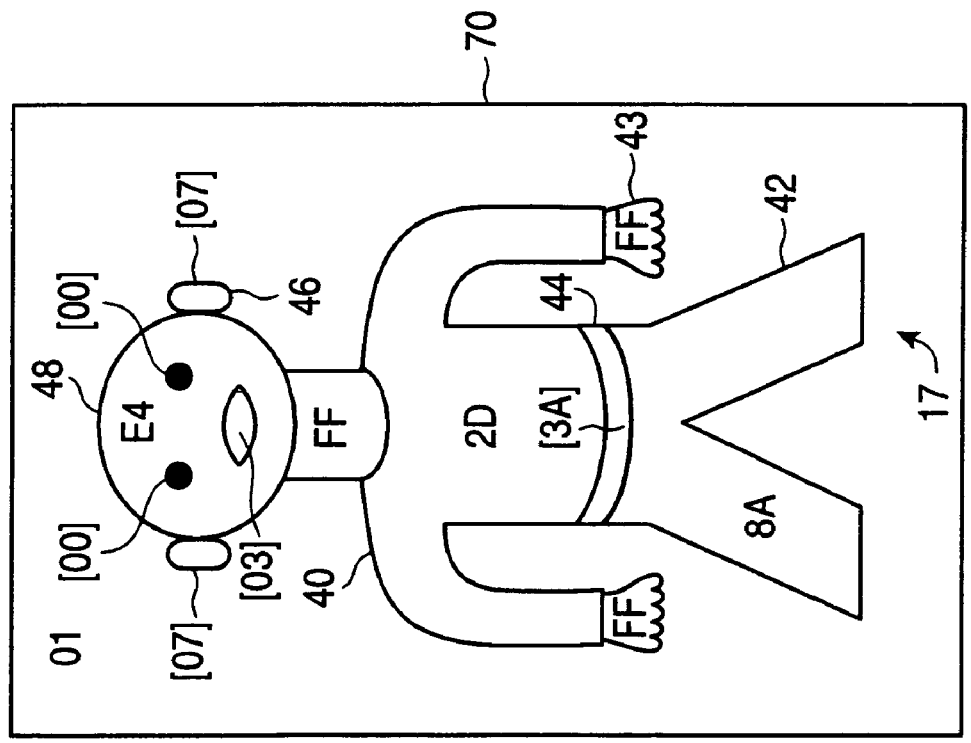

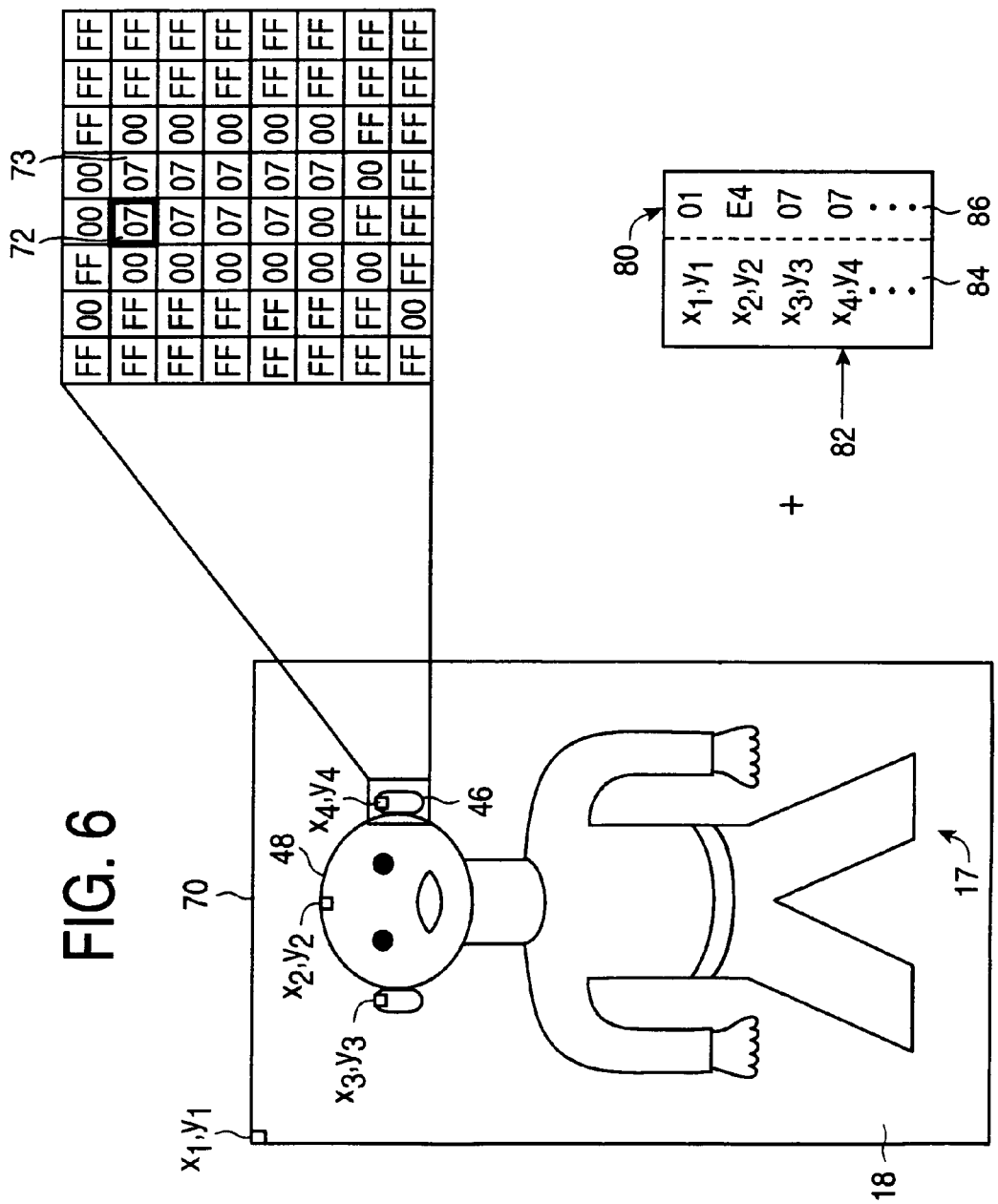

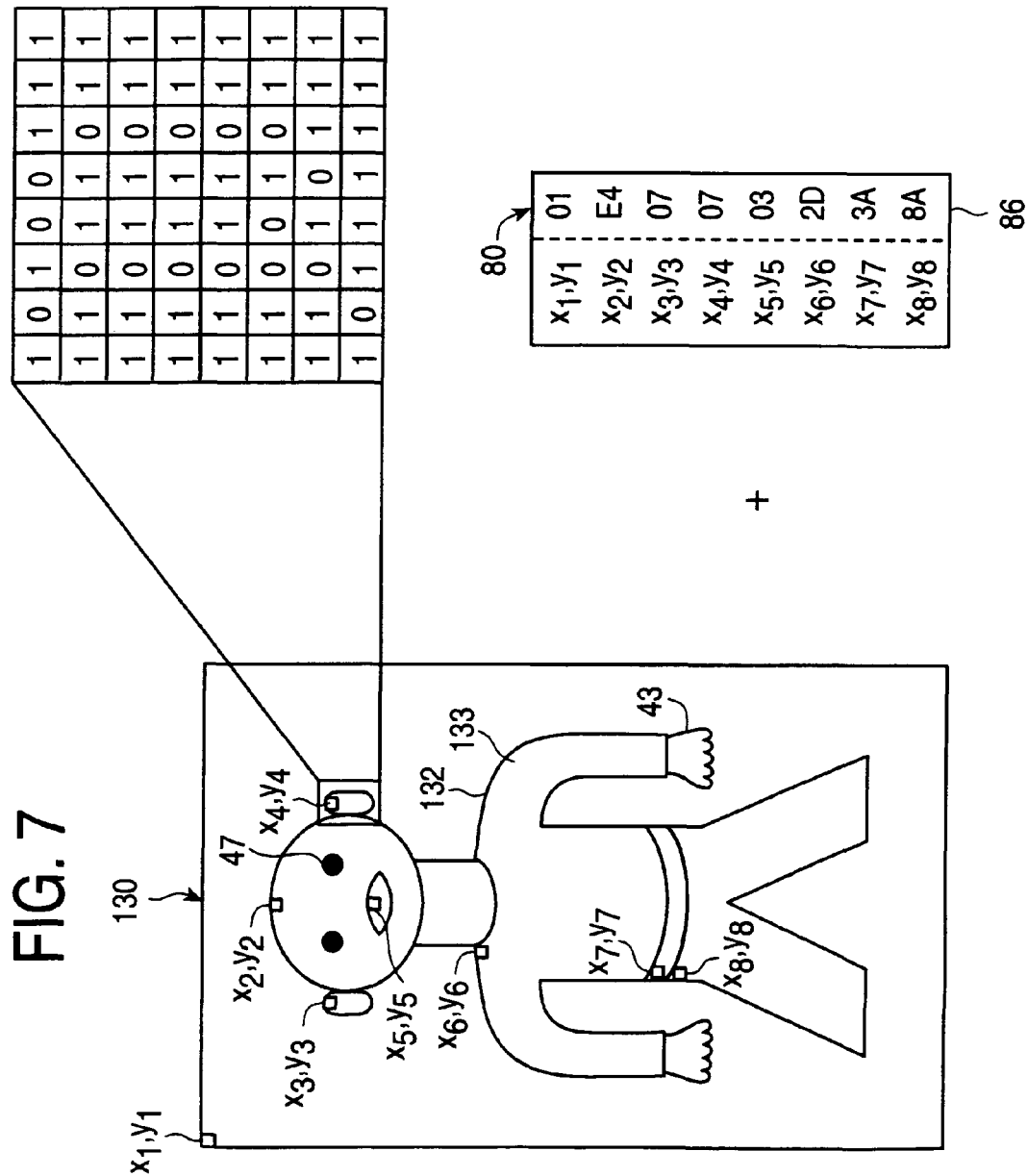

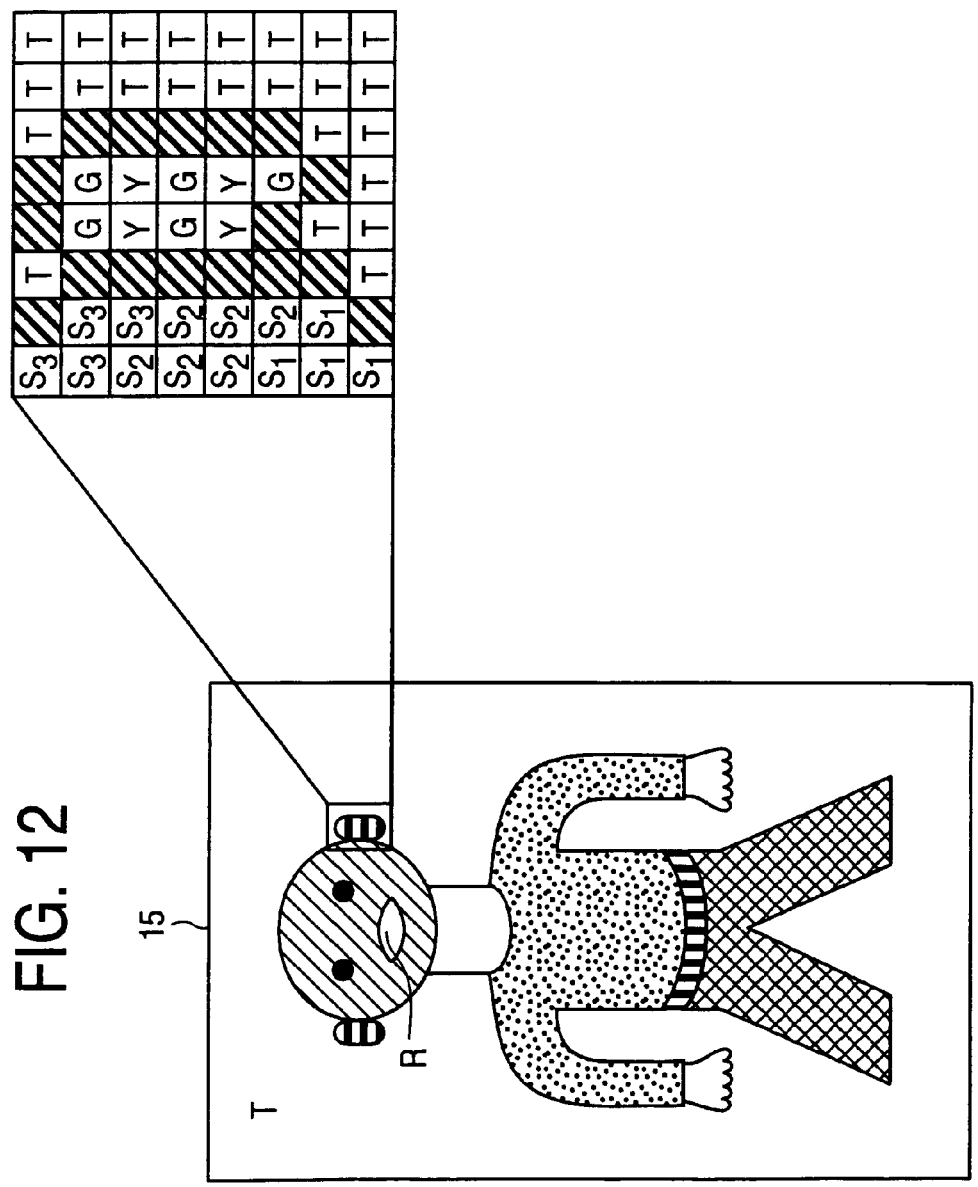

BITMAP IMAGE COMPRESSING

This is a continuation of application Ser. No. 08/468,290, filed Jun. 6, 1995, now abandoned.

BACKGROUND

This invention relates to image compressing.

Multimedia programs and games often display animation on a computer screen by the use of transparent bitmaps or "sprites". Each sprite may include regions each exhibiting its own color. Like animation cells in cartoon animation, a series of sprites is overlaid on a background to create the illusion of motion. Most computer animation titles start with an artist drawing black and white line drawings on paper, scanning them into a computer, and then colorizing the image.

MultiMedia animation sequences can be made up of many different sprites, some moving more than others, with as many as one-hundred or more bitmaps being displayed per second. A typical Windows MultiMedia bitmap takes one byte per pixel, so that a 640×480 pixel screen takes 300,000 bytes. A sprite that measures 100×100 pixels takes 10,000 bytes (1/30th of the screen size).

Sprites are stored, along with the computer animation program, on a hard disk drive or CD-ROM. Because sprites occupy a large amount of disk space, a customer's hard disk drive could be filled by a single multimedia title. In a CD-ROM drive, which is slower than a hard disk drive, it is difficult to pull the large sprites from the CD-ROM drive quickly enough to create a convincing illusion of motion.

Sometimes the sprites are compressed for storage and decompressed for display on the screen. Compression ratios of 2:1 have been achieved for complex multi-color images. Higher compression ratios are possible using sprites having only simple solid color patterns, or slower decompression algorithms, or lossy compression.

Some titles such as "Freddie Fish and the Missing Kelp Seeds" use simple coloring schemes. Titles built from Macromedia's Director tool, such as "Barbie and Her Magical House", slow down the animation rate and use transitions rather than animation. Broderbund's Living Books titles use small sprites and animate only one object at a time.

Some game systems, such as Nintendo or Sega, store a few generic sprites, and re-use them as much as possible. For example, to make Mario run, "Mario Brothers" needs just three or four sprites showing Mario in different stages of running. A whole title can be built out of about a hundred sprites.

Most DOS-based titles use 320×200 resolution. For example, "DOOM" uses the 320×200 mode and small sprites (maybe 20×20 pixels) that are scaled up in size. "7th Guest" crops off the top and bottom of the screen for a "letterbox" style format that is about 600×200.

SUMMARY

In general, in one aspect, the invention features a method of compressing an image (e.g., a sprite) having at least three textures (e.g., colors or patterns). In the method, a map is generated which represents boundaries separating regions of the image, and pointers are generated associating the regions with respective ones of the textures.

Implementations of the invention may include the following features. The map may be a bitmap having boundaries comprising pixels of a first value (representing a first texture), and regions comprising pixels of other values (representing other textures). A code may be assigned to each texture in the image, and each pointer includes one of the codes and an identifier of a location within the region. The map may be generated by converting each pixel in the image not of the first texture (e.g., each non-boundary pixel) to a second texture. The map may be encoded, such as by run-length encoding.

In general, in another aspect, the invention features a data structure, including boundaries separating regions in an image, and pointers associating regions with textures.

In implementations of the invention, the data structure may include a palette associating each texture with a code, and each pointer may include an identifier of a location within the region and a single code (identifying the texture of the region).

In general, in another aspect, the invention features a method of decompressing an image. A map representing boundaries separating regions is provided. Pointers are referenced to determine textures associated with the regions, and the regions are filled with the determined textures.

Implementations of the invention may include the following features. A pointer may be referenced to determine an identifier of a location within the region. A region containing the determined location may be converted into the determined texture. A region may be filled by determining a function associated with the texture, and converting each pixel in the region into a pixel color according to the function. Each pixel may be converted by a seed fill, which may be commenced at the determined location.

Advantages of the invention include one or more of the following. It provides better compression than the RLE compression method, yet it works with complex patterned images. More sprites may be stored on disk, and the stored sprites may have larger dimensions (more pixels in the image). The sprites may be retrieved and decompressed more quickly to increase the animation frame rate. Sprites may include complicated patterns and more colors. These advantages can be achieved on mass market consumer-quality personal computers.

Other advantages and features of the invention will become apparent from the following description and the claims.

DESCRIPTION

FIGS. 2 and 4-7 are schematic representations of sprites at different stages of compression.

FIG. 3 shows a texture palette.

FIGS. 11-12 are schematic representations of sprites at different stages of decompression.

Figure 1:
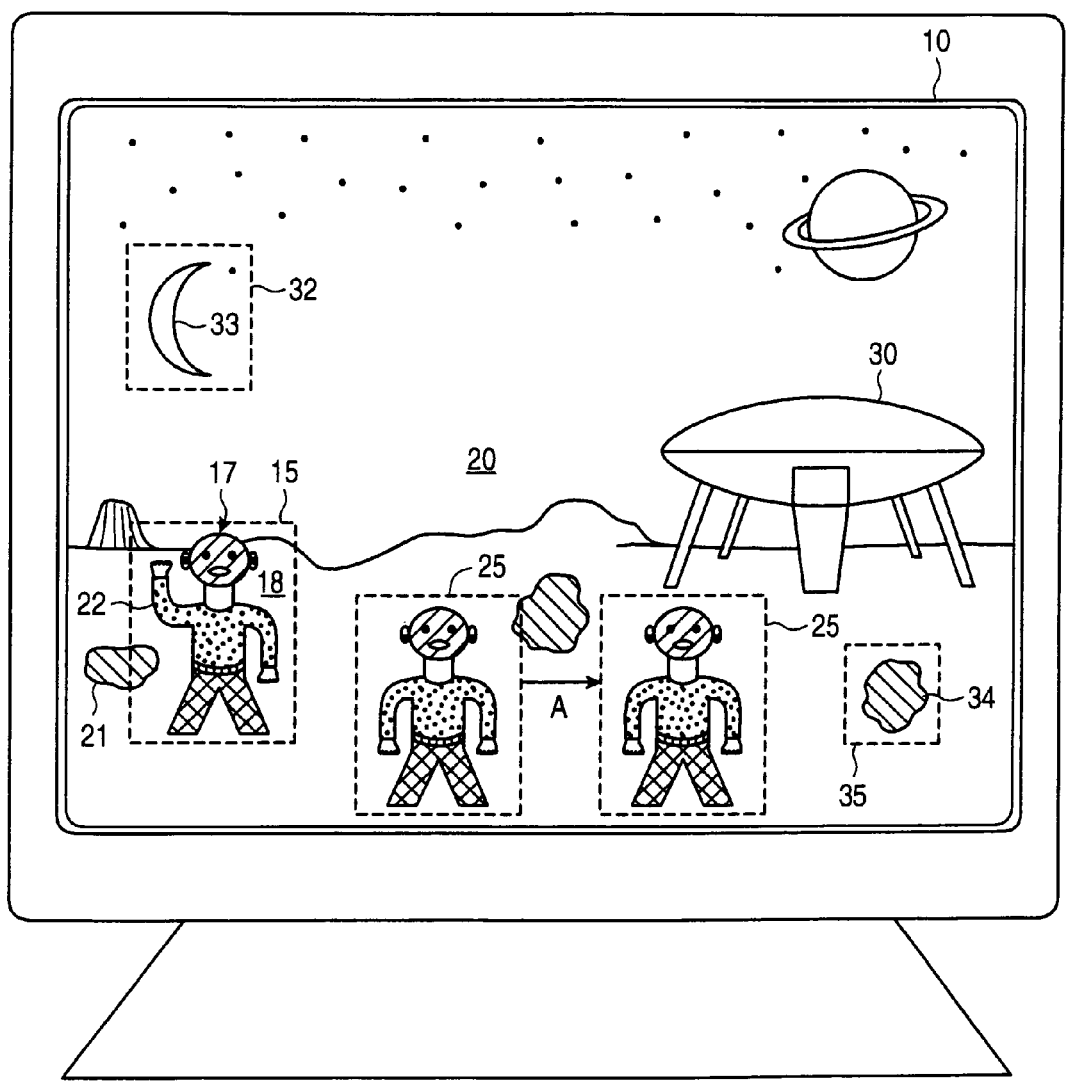
FIG. 1 is a background with superimposed sprites.

The invention is intended for use in a Windows Multimedia system, but is easily extended to the Macintosh and other systems. As seen in FIG. 1, to generate the illusion of a moving alien 17 on a computer screen 10, a series of rectangular sprites 15 are superimposed (at a rate of fifteen frames per second) onto lunar background 20. Sprite 15 includes a solid alien 17 which obscures background 20. The remainder of sprite 15 is a transparent window 18 through which background 20 (e.g., rock 21) may be seen. To make alien 17 wave goodbye, a series of sprites 15, each showing alien 17 with arm 22 in a slightly different position, could be displayed in succession at the same location on background 20. To make alien 17 move toward ship 30, a series of sprites 25 could be overlaid onto different locations on background 20 in successive frames. Sprite 32 with crescent earth 33 and sprite 34 with moonrock 35 may appear on background 20 simultaneously with sprite 15.

The "realistic" and attractive sprite 15 shown by FIG. 2 has regions filled with a variety of colors (or tones on a greyscale screen), some configured in complicated patterns. Alien 17 might have a speckled blue shirt 40 and green and red plaid pants 42. If sprite 15 measures 100×100 pixels, and each pixel takes one byte, then sprite 15 could take ten kilobytes of storage space.

Typically, Windows Multimedia sprites are stored as device independent bitmaps (DIBs). In some DIBs, a pixel value is an index into a palette of colors. For example, most Windows DIBs based on a palette of 256 colors, and each pixel is a one-byte index into the palette. The palette translates each byte (a value from zero to 255) into a series of red, green, and blue values of zero to 255. There are many many pixels (10,000 for a 100×100 bitmap), each of which represents one of two-hundred fifty-six colors.

In other bitmaps, the pixels represent some form of color value. For example, a pixel may be three bytes, with one byte for each red, green and blue value. Other bitmaps allow for sixteen bit pixels with each red, green, and blue value taking five or six bits.

Both a direct representation of color values, where each pixel represents a color value, and a "palletized" representation, with the pixels being indexes into the palette, work with this invention. The described embodiment uses a common Windows method: palletized images with one-byte pixels. Texture functions may return either an index into the target image's palette as well or an RGB value.

As shown in FIGS. 2 and 3, an animator wishing to create sprite 15 first defines a texture palette 60 of the different colors and color patterns which will be used in all of the sprites appearing on background 20. This is done once per animation title or major scene. Each solid color, such as the solid red of mouth 45, and each color pattern, such as the green and yellow stripes of ear 46, is a different texture 62. The border 50 which outlines shirt 40 could be a solid black texture, while the interior 52 of shirt 40 could be a speckled blue texture. Head 48 could shade from grey in the lower left to brown in the upper right. In addition, transparent window 18 which does not obscure background 20 is considered a texture.

Each texture is created by some bitmap or function 66. The solid red of the alien's mouth 45 could be created with a single pixel bitmap, whereas the green and red plaid of pants 42 could be created by a larger rectangular area, perhaps a 8×8 or 16×16 pixel bitmap. The gradual shade of the alien's head 48 could be created by a function which returns a color value in response to horizontal and vertical position values. The texture in the multicolor striped belt 44, which changes only horizontally, could be created by a 1×8 pixel bitmap, while the texture of green and yellow striped ear 46, which changes vertically, could be created by a 2×1 pixel bitmap.

Each texture 62 has a code 64 which serves as an index to its bitmap or function 66. Black may be labelled with the traditional 00, white with FF (two hexadecimal numbers where only one byte is used for the code). The other textures may be given arbitrary codes, such as 01 for transparent, 03 for solid red, 2D for the speckled blue, and E4 for the grey and brown shading.

If a standard tool is used for colorizing and decolorizing the image, then there is a practical limit of 253 possible textures. Assuming one byte per pixel, the palette 60 can have 256 codes. Two of the 256 codes are reserved for black (or "line color") and white (or "not line color"), and another code is reserved for transparent. Each of the other textures, whether bitmap or function, is assigned one the remaining 253 codes. If a customized tool is used, then there may be an unlimited number of textures.

The animator's step of producing a cell 70 (which will become sprite 15 when displayed on screen 10) containing alien 17 is shown in FIGS. 4 and 5. In general, the animator first creates a black and white line drawing 53 of the alien 17, which may be stored as a pixel map in the computer. Cell 70 thus begins with black (00) boundary pixels bordering white (FF) regions. The animator might draw the line with pen and paper and then scan in the drawing, or the animator might use a computer drawing or painting program, or the animator might use a computer-aided "morphing" tool to generate cell 70.

Then the animator fills the black and white line drawing 53 with textures using a software fill tool (such as the paint roller in Windows Paintbrush). A fill tool generally operates by changing all adjacent pixels (typically horizontally and vertically but not diagonally) of an original color to a different color. The filling stops when it reaches a pixel of a color different from the original color. As shown in FIG. 4, the animator has already filled window area 18 with the code for the transparent texture (01). When the animator fills ear 46, all the pixels which were labeled by the code FF are changed to code 07. Only the white pixels inside the black boundary 56 (code 00) outlining ear 46 are changed. If lines do not meet, then colors may "bleed" into adjoining areas. For example, if the ear boundary 56 was not closed because pixel 58 was white, then the texture (code O7) would fill head 48.

The animator may use a software painting or drawing tool to make additional changes to cell 70, but normally each region enclosed by a black boundary should contain pixels of only one texture. More black points, lines (which need not enclose a region), and regions, may be added. For example, all the pixels in eye 47 may be solid black. Completed cell 70, shown by FIG. 5, will include regions, such as pants 42, having a black border. In the pixel map, each pixel in pants 42 has the same code for green and red plaid (8A). Glove 43 which was never altered, contains pixels with the code for white (FF).

When the animator creates cell 70, the colors displayed on the screen 10 need not match the textures to be generated when the sprite 15 is displayed in a program. For example, the painting tool may show solid blue as a placeholder for speckled blue in shirt 40, and solid brown as a placeholder for green and red plaid in pants 42.

The animator then decolorizes completed cell 70. Referring to FIGS. 6 and 7, a decolorizing computer program scans the cell 70 from top to bottom, left to right, pixel by pixel. At any pixel which is neither black nor white, the program performs two operations. First, the program adds an entry 82 into a list 80 associating the current pixel with the texture of that pixel. This entry includes the co-ordinates 84 (the vertical and horizontal position x,y) of the current pixel within the bitmap, and the code 86 of the texture of the current pixel. Second, the program temporarily suspends its pixel by pixel scan, and changes all the pixels in the black bordered region to white. This may be accomplished with a seed fill tool which changes all adjacent pixels having the code of the current pixel into white pixels. Usually, diagonal pixels are not considered adjacent, though on some systems they may be. This is generally the same algorithm as used by a standard paint program to fill in an enclosed white area with a color. The filling stops when it reaches black boundary pixels. Once the seed fill is complete, the program resumes the pixel by pixel scan at the next pixel in line.

In FIG. 6, the transparent window 18 and head 48 have already been converted to white (FF). As the program scans cell 70, it encounters pixel 72 in ear 46. The coordinates $X_4$, $Y_4$ and code (07) of pixel 72 are stored in list 80. The coordinates X and Y are integers between zero and the width and height of the bitmap, respectively. Once the coordinates and code are stored in list 80, the program converts all the pixels in ear 46 to white. Thus all pixels in ear 46 that were labeled with code 07 are changed to code FF. The program then continues scanning for pixels which are neither black nor white, resuming at pixel 73. Since pixel 73 and the other pixels in ear 46 have already been converted to white by the seed fill, the program will not make another entry in list 80 for any pixel in ear 46.

Figure 8:
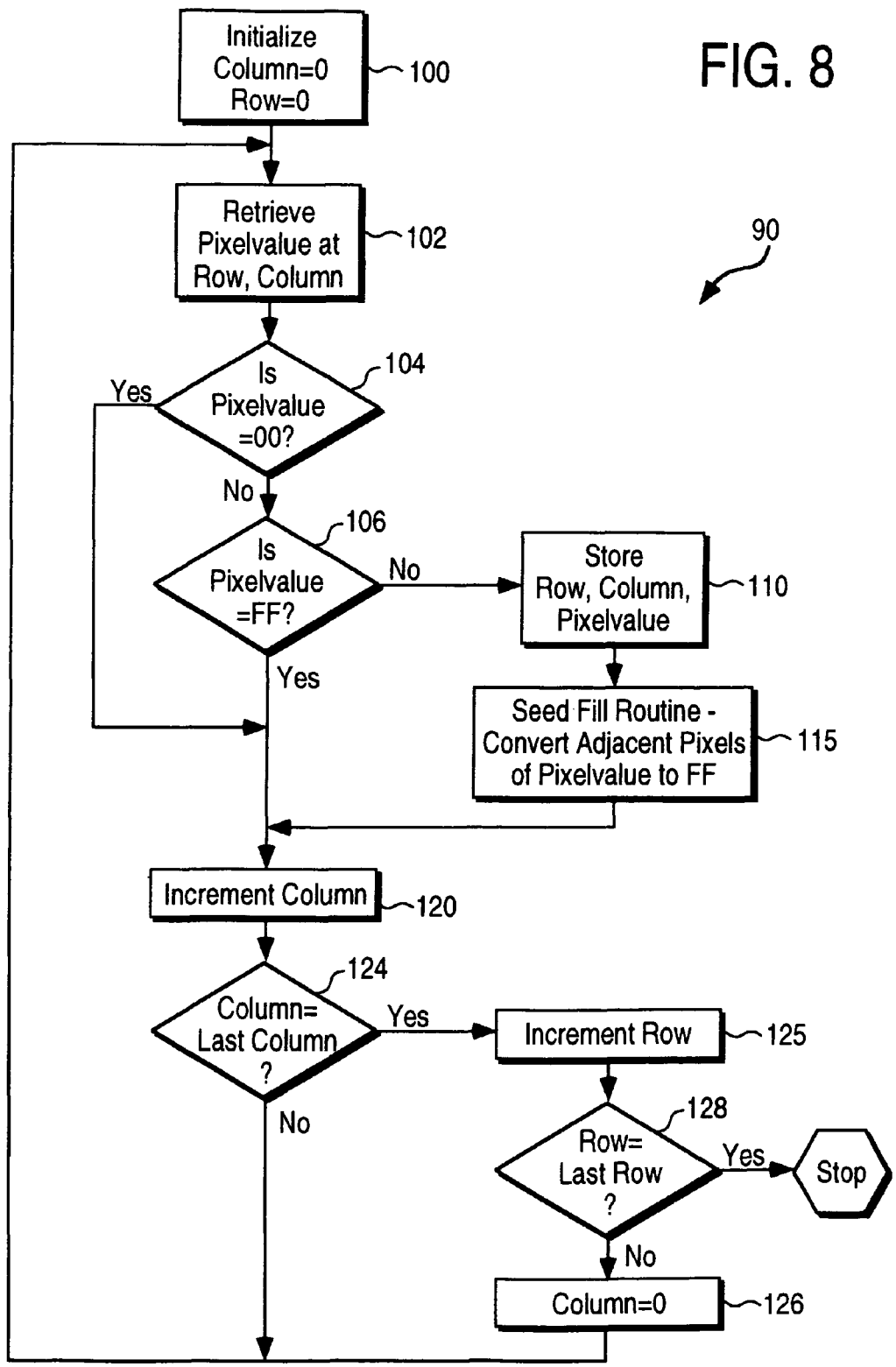
FIG. 8 is a flowchart for the process of decolorizing a cell.

A flowchart of a program 90 to carry out the invention is shown in FIG. 8. The program 90 uses the variables row and column to indicate the coordinates in the cell, and pixelvalue to indicate the code of a pixel. In step 100, row and column are initialized to zero. In steps 102-106, program 90 retrieves the code of the pixel and determines whether the pixel is black or white. Assuming that the pixel is neither black nor white, then in step 110 program 90 stores the row, column, and pixelvalue to list 80. Then in step 115, program 90 converts (by seed fill) all adjacent pixels of color pixelvalue to white.

Having completed step 115, or if the pixel is either black or white, program 90 increments column in step 120. In steps 124-126, if column exceeds the width of the bitmap, lastcolumn, then row is incremented and column is reset to zero. As shown by step 128, if row exceeds the height of the bitmap, lastrow, the program 90 has reached the end of the bitmap, and program 90 stops. Otherwise, the program continues at the next pixel in step 102.

After decolorization, the resulting cell 70 is a two-tone (black and white) image. The image may be compressed by converting one-byte-per-pixel cell 70 into a one-bit-per-pixel monochrome bitmap 130. This compression may be carried out either simultaneously with the decolorization step or separately.

The product of the decolorization and compression steps is, as illustrated by FIG. 7, a monochrome image 130 showing boundaries 132 separating regions 133, and a list 80 associating each region 133 with the texture 86 that was in the region 133. There are no entries in list 80 for the regions, such as glove 43 or eye 47, that were originally white or black. Conversion to the one-bit-per-pixel monochrome bitmap results in an 8:1 compression, with an overhead of about 3 bytes per textured region (assuming the horizontal and vertical coordinate and the texture code are one byte each).

Once the image has been decolorized and converted into a one-bit-per-pixel bitmap 130 and associated list 80, the bitmap 130 may optionally be further compressed by other efficient techniques applicable to monochrome images, such as run length encoding (RLE). With RLE, the present invention can easily yield 20:1 compression relative to the original textured image.

Figure 9:
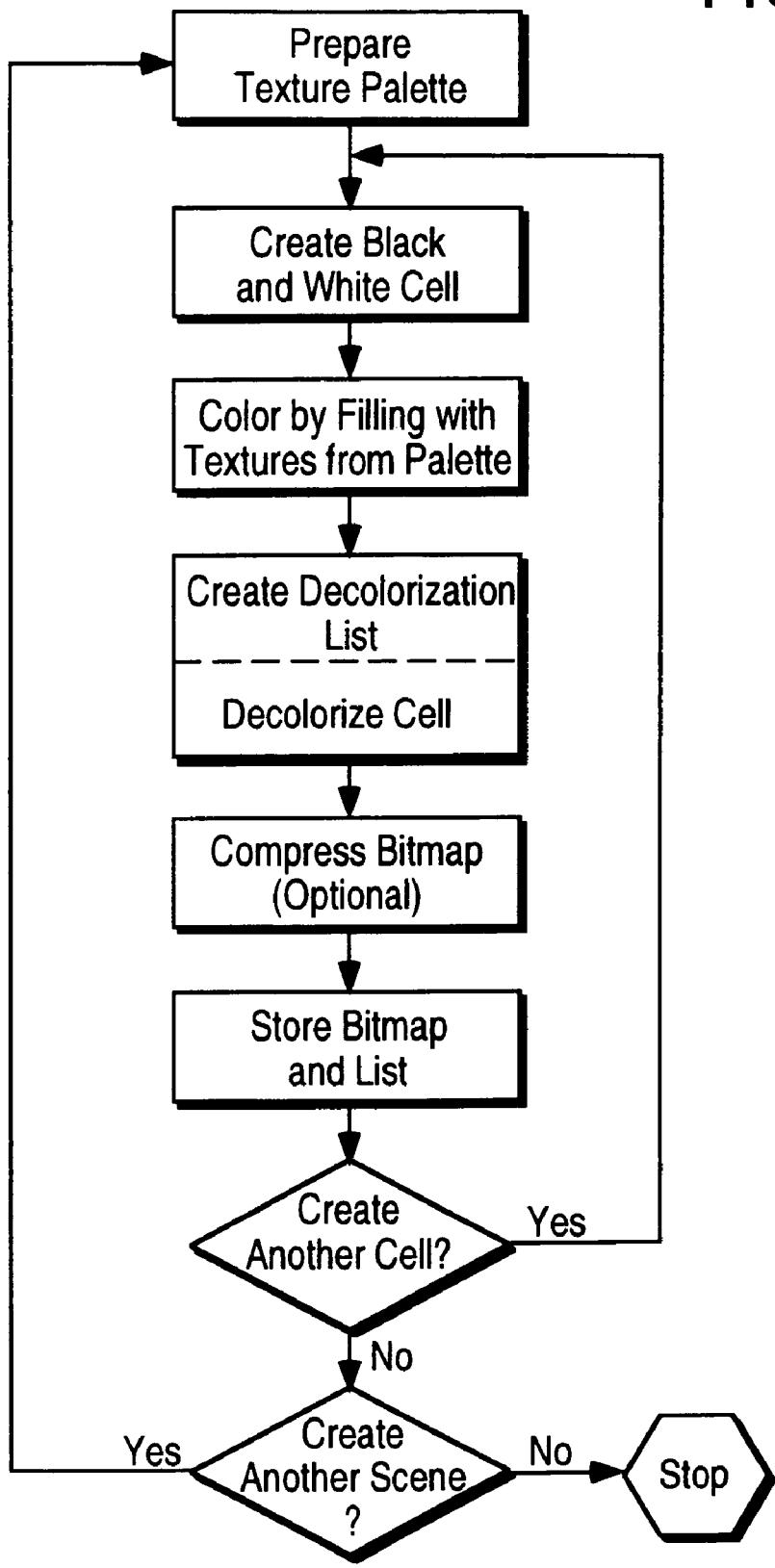
FIG. 9 is an overview of the compression process in flowchart format.

In summary, as shown in the flowchart of FIG. 9, the first step in creating sprites is to prepare and store a set of textures, which may be solid colors (or tones for a greyscale screen), bitmap patterns, or functions. This step need only be performed once per animation sequence, or even only once per application. The animator then creates a cell by forming a black and white image and filling the regions of the image with prepared textures. The cell is then decolorized and compressed to form a monochrome bitmap and a list associating the regions with the textures that were in the regions. Additional compression of the monochrome bitmap may be performed. Finally, the monochrome bitmap and associated list are stored for later retrieval by an application.

Figure 10:
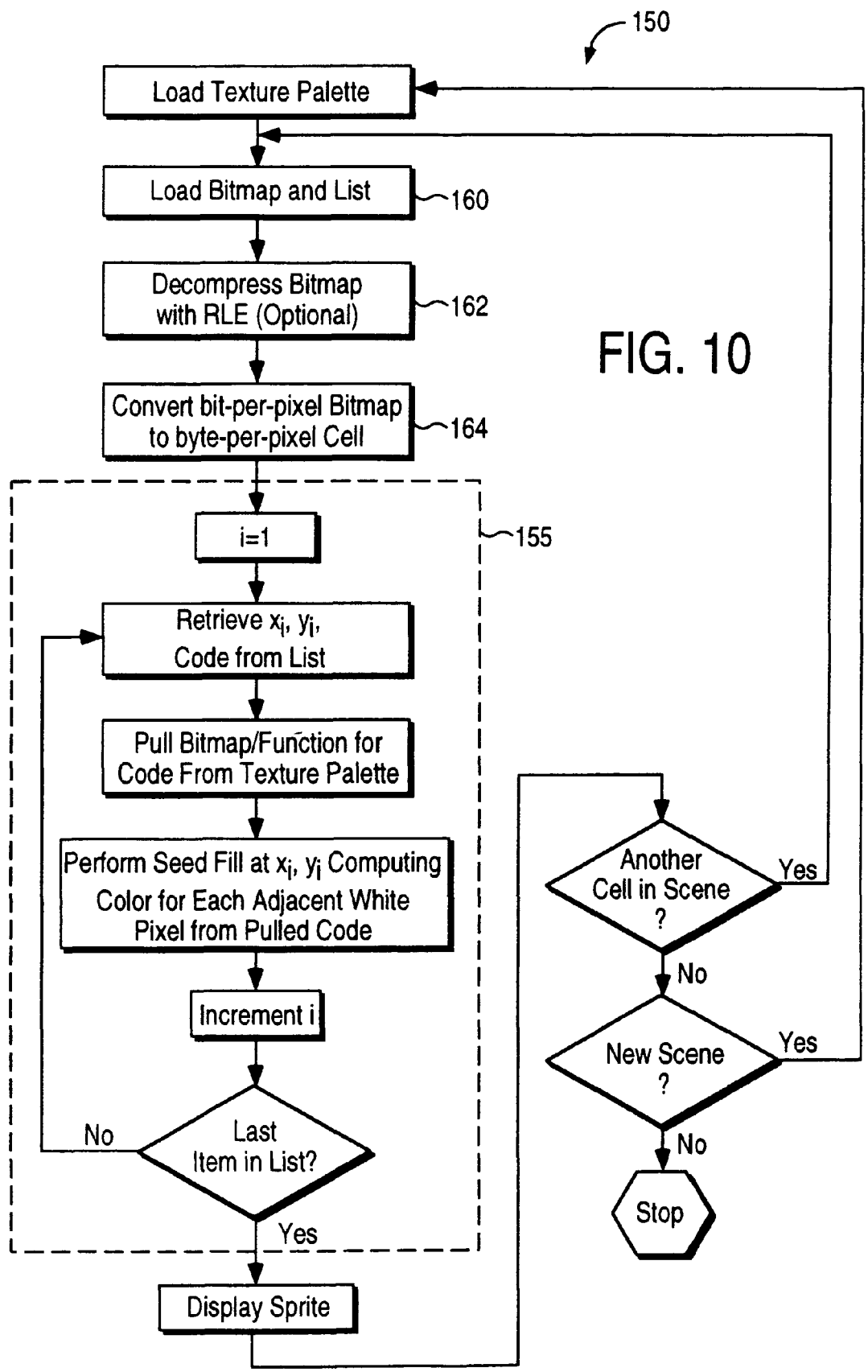
FIG. 10 is a flowchart for the process of decompressing and recolorizing a cell.

To decompress a stored image, the steps of compression are basically performed in reverse order. Decompression of bitmap 130 is performed by a decompression computer program 150. As shown by FIG. 10, at the beginning of each application or animation sequence, program 150 loads the palette of textures 60. Then, program 150 loads the individual monochrome bitmap 130 and associated list 80. If the monochrome bitmap 130 has been additionally compressed (such as by RLE encoding), it is decompressed. Then, program 150 converts the one-bit-per-pixel monochrome bitmap 130 into a one-byte-per-pixel cell 70. Finally, cell 70 is "recolorized" by adding textures to the regions. In particular, recolorizing subprogram 155 performs a set of modified seed fills using the appropriate textures from the list. The sprite may now be displayed on the screen, and a new image loaded.

Bitmap 130 and associated list 80 are stored in computer memory in step 160. In step 162, the one-bit per pixel monochrome bitmap may be extracted from an RLE format (the result is shown in FIG. 7). The bitmap 130 is then decompressed in step 164 by changing each one-bit code into a one byte code; zeros are changed into black pixels (00) and ones are changed into white pixels (FF). Each byte for each pixel now represents an actual color (or tone in a greyscale system) to be displayed on screen 10, rather than a texture.

After having created the one-byte per pixel cell 70, subprogram 155 recolorizes cell 70 by performing a modified seed fill for each entry in the list 80. Subprogram 155 reads each entry 82 in list 80 in turn. For each entry, the program reads the set of coordinates 84 and the texture code 86. Then, the computer identifies the bitmap or function 66 associated with the texture code 86 in the texture palette 60. Then, starting at coordinates 84, the program searches for every adjacent white pixel. At each located pixel, the program computes the proper color for that pixel based on bitmap or function 66, and changes the white pixel into the appropriate color. It may be useful to ensure that a function not return either black or white pixels. Once the program has changed all adjacent white pixels, it reads the next set of coordinates and texture from the list. If the subprogram has finished the last entry in the list, sprite 15 has been recolorized. Decompressed sprite 15 is now displayed on screen 10 by combining sprite 15 with background 20.

Figure 11:
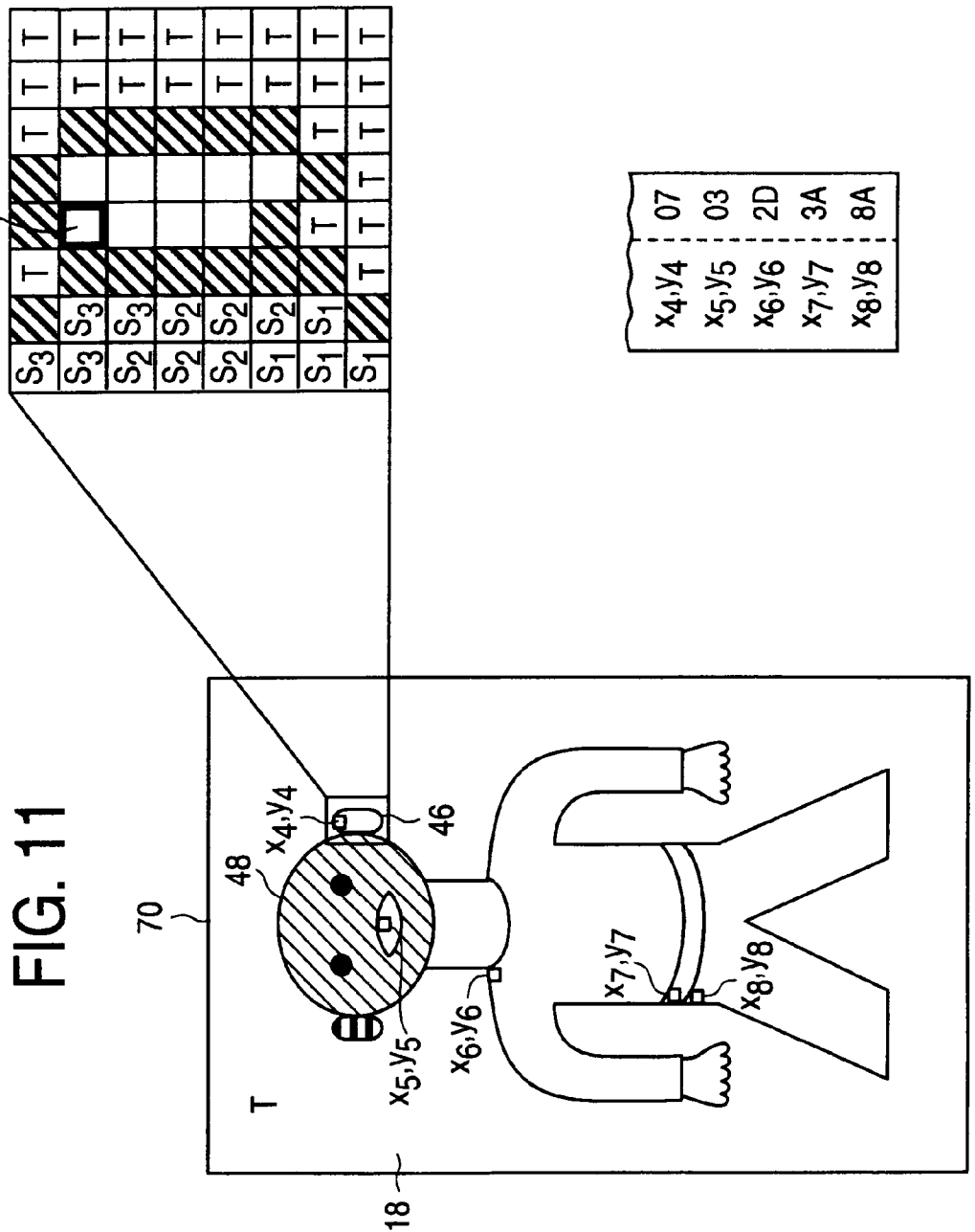

In FIG. 11, the program has performed seed fill operations for the first three coordinates in the list. The pixels in background 18 have been turned from white (empty) to transparent (T), and the pixels in head 48 have been turned from white (empty) to different shades ($S_1$ to $S_3$). The program now performs a modified seed fill, starting at the upper-leftmost pixel 72 of ear 46. The modified seed fill determines the proper color, either green (G) or yellow (Y) to place in the individual pixels by using the 2×1 bitmap 66 from texture table 60 corresponding to the texture code 64.

As shown in FIG. 12, once the program has completed the list, enclosed regions, such as shirt 40, pants 42, and belt 44 have been filled with a complex pattern of colored pixels. For example, ear 46 is filled with alternating horizontal stripes of green (G) and yellow (Y) pixels.

Other embodiments are within the scope of the following claims. For example, in decompressing an image, before the final bitmap using colors is created, an intermediate bitmap could be created to store the texture code for each pixel. The final bitmap would be created by scanning the intermediate bitmap pixel by pixel and determining the appropriate color.

Virtually any sort of program may be used to create cell 70. For example, a drawing program that manipulates objects could be used instead of a painting program to create cell 70. In such a case, the invention would convert the set of objects from the drawing program into monochrome bitmap 130 and associated list 80.

Because seed fill algorithms are extremely fast, the invention is able to simultaneously achieve a high compression ratio and fast decompression. Thus, a series of highly detailed sprites 15, each showing alien 17 with arm 22 in a slightly different position, could be loaded, decompressed, recolorized, and displayed at a high rate of speed, to produce the image of alien 17 waving goodbye.

What is claimed is:

1. A method comprising:
   displaying a digital image having at least three textures whose amount of storage space required for holding it prior to a time when the image is to be displayed has been reduced, comprising:
   providing a bitmap representing only boundary pixels in said image separating regions, said regions comprising image pixels of said image, each region between boundary pixels being composed of one of the textures;
   referencing a pointer that associates one of said textures with one of said regions;
   filling said one of said regions in said bitmap with said associated one of said textures;
   overlaying said image on a background; and
   wherein said providing, referencing, filling, and overlaying are repeated for a succession of images to create the illusion of motion.

2. A method comprising:
   displaying a digital image having at least three textures whose amount of storage space required for holding it prior to a time when the image is to be displayed is reduced, comprising:
   generating a bitmap representing only boundary pixels in said image separating digital image regions in said image, said regions comprising image pixels of said image, each region between boundary pixels being composed of one of the textures;
   generating a pointer for each of said regions, each of said pointers associating its respective region with the one of said textures for the digital image in such region;
   storing the bitmap of boundary pixels and the pointers defining the textures for the regions between boundary pixels for later use in displaying the image;
   referencing said pointers associating said one of said textures with said one of said regions;
   filling said regions in said map with its associated one of said textures; and
   overlaying said image on a background.

3. Apparatus comprising:
   a microprocessor;
   a memory coupled to the microprocessor, the memory being configured to cause the microprocessor to:
   display a digital image having at least three textures, by:
   a) generating a bitmap representing only boundary pixels in said image separating regions in said image, said regions comprising image pixels of said image, each region between boundary pixels being composed of one of the textures;
   b) generating a pointer for each of said regions, each of said pointers associating its respective region with the one of said textures for the image in such region;
   c) storing the bitmap of boundary pixels and the pointers defining the textures for the regions between boundary pixels in said memory;
   d) referencing said pointers associating said one of said textures with said one of said regions;
   e) filling each of said regions in said bitmap with its associated one of said textures; and
   f) overlaying said image on a background.

4. A method of producing a digital image for efficient compression, the digital image being made up of a plurality of textures, the method comprising:
   defining a texture palette, wherein each possible texture of the digital image is assigned a unique code;
   generating a bitmap of the digital image, wherein the bitmap comprises:
   pixels of one code representing boundaries of the digital image; and
   pixels of different codes representing textures of the digital image;
   decolorizing the bitmap of the digital image into a monochrome bitmap made up of only two pixel values, one pixel value representing the boundaries of the digital image;
   wherein said decolorizing further comprises:
   creating a list relating textures to locations in the bitmap;
   retrieving each pixel of the bitmap, wherein said retrieval comprises:
   skipping over each pixel which represents the boundaries of the digital image; and
   adding each pixel of the bitmap which is not a predetermined texture to the list, including the location of the pixel; and
   changing the pixel and like adjacent pixels to one of the predetermined textures.

5. The method of claim 4, wherein the pixel which represents boundaries of the digital image is a black pixel and the pixel of a predetermined texture is a white pixel.

6. The method of claim 4, wherein the monochrome bitmap of the digital image is stored as one byte per pixel of the monochrome bitmap.

7. The method of claim 6, wherein the monochrome bitmap of the digital image is compressed from one byte per pixel into one bit per pixel.

8. The method of claim 7, wherein the one bit per pixel monochrome bitmap is further compressed using a run length encoding compression method.

9. The method of claim 4, wherein each unique code of the texture map is an index into either a bitmap representing a texture or a function used to generate a texture.

10. The method of claim 9, wherein the textures of the texture map which are solid colors are generated by a one-pixel bitmap.

11. The method of claim 9, wherein each unique code of the texture map is a one-byte code.

* * * * *